Figure 1:
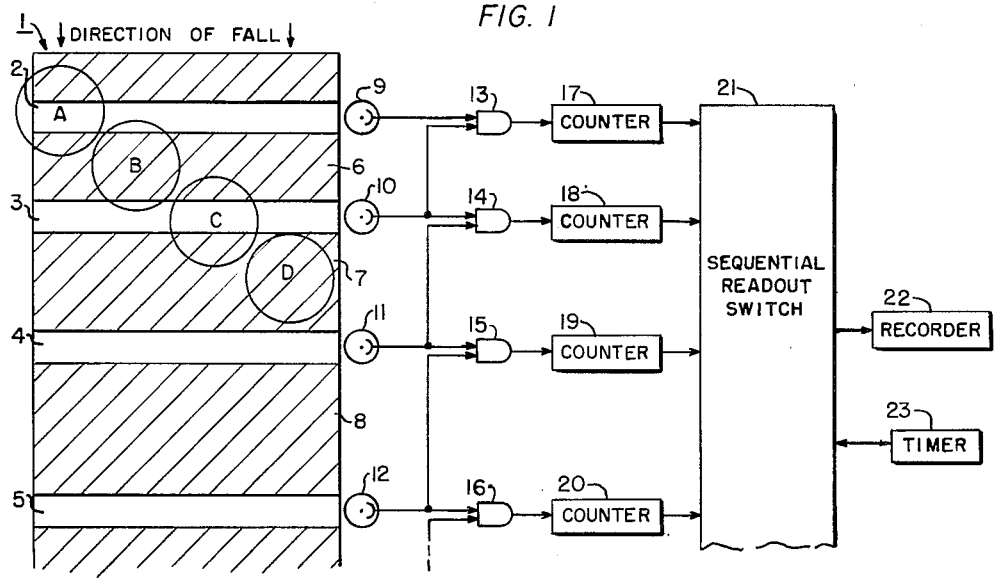

Oct. 20, 1964          A. M. NATHAN          3,153,727
AUTOMATIC RAINDROP SIZE SPECTROMETER AND RECORDER
Filed May 31, 1963

INVENTOR,
ALAN M. NATHAN.
BY Harry M. Saragovitz,
Edward J. Kelly
Herbert Berl &
Julian C. Keppler
ATTORNEYs

United States Patent Office 3,153,727
Patented Oct. 20, 1964

3,153,727
AUTOMATIC RAINDROP SIZE SPECTROMETER
AND RECORDER
Alan M. Nathan, New York, N.Y., assignor to the United States of America as represented by the Secretary of the Army
Filed May 31, 1963, Ser. No. 284,764
6 Claims. (Cl. 250—222)

This invention relates to means for measuring and counting spherical objects at high speeds and more particularly to a device for measuring and counting raindrops which fall through a given sample volume in space.

Knowing the size and number of raindrops is becoming increasingly necessary. Weather researchers need the information to study the formation of rain and to perfect radar measurements of water particles in the atmosphere. Soil scientists need such information to study erosion. Safety engineers and aircraft designers must know the size and number of raindrops to determine the effects of rain on jet engines and on the surfaces of supersonic aircraft and missiles.

Sizing raindrops accurately and reliably has been a problem of long standing. Efforts to devise a satisfactory technique range from the measurement of splash areas on slate, filter paper, or nylon mesh to optical or photographic techniques. To date, none of the prior techniques are truly adequate. Difficulties include biased sampling, interference with the natural drop size distribution by the device itself, poor resolution and accuracy at either or both ends of the drop size spectrum, insufficient sample for statistically valid data, and tedious data reduction requirements.

Two major classes of optical techniques have been employed: (1) Instruments which form actual images of the drops for immediate sizing or photographic recording. (2) Instruments which involve the observation of some portion of the scattered light from an illuminated drop and the measurement of its intensity as a measure of size.

Those instruments which form actual images of droplets for sizing purposes usually have employed photographic recording of either stationary droplet image or streaks produced by falling droplets. The photographic record is subsequently examined or scanned automatically to obtain droplet size data. Automatic scanning systems have been developed using either flying spot or slit scan techniques to size photographic images.

Another approach that has been suggested is to use a vidicon camera tube to record temporarily the streak images of falling droplets which can then be sized automatically by an electronic flying spot scan on the face of the tube to measure the chord of the droplets by crossing the streak images. Such a television technique does offer large amounts of data in a short time but suffers from complexity and inadequate resolution (smallest size drop 0.25 mm.). The photographic approaches are far from being ideal in that they do not offer automaticity and require elaborate scanning devices for subsequent analysis.

The second class of optical techniques which has been employed is the use of scattered light from illuminated drops. Usually the intensity of the light scattered into a restricted solid angle is measured and related to drop size. Although this approach is a classical one, particularly for aerosols composed of very small droplets, it suffers from severe disadvantages. The accuracy obtained has been generally low, calibration can change with the aging of components or a change in source light intensity, signal pulse amplitude must be measured electronically rather than time or a go no-go technique such as herein described, and sampling volume must be inordinately small to avoid observing more than one drop at a time. Finally, the technique's accuracy depends completely on the sphericity of the drops—a condition never exactly met by raindrops whose shape oscillates slightly from that of sphere. For non-spherical drops, the calibration can be greatly affected.

It is therefore an object of this invention to provide a device which overcomes the deficiencies of the prior art.

Another object of this invention is to provide an improved device for measuring the size of raindrops and other rapidly moving spherical or sphere-like objects.

According to the present invention a raindrop sizer and counter is placed outdoors to collect information on all the raindrops that fall through an area about 5 inches square. Information relating to the number of various sized raindrops is sorted out by electronic circuits and stored in a memory or counter unit which can be placed in a shelter some distance away. This memory unit stores the data for as long as a minute and then records it on tape. Later, the tape record of several hours of rainfall can be fed directly into a computer for analysis.

In a specific embodiment of this invention droplets falling freely through a brightly illuminated sampling region are viewed against a black background by an optical system which images the droplets on a planar grid or array of slits. These slits or windows, all of the same size are separated by opaque graps of gradually increasing height progressing to the bottom of the grid. All droplets within the sampling region form bright circular images which traverse the windows in succession as the droplet falls freely through the field. As a drop image crosses slit 1, a photosensitive detector will be actuated. Subsequently, the bottom of the drop image will pass onto slit 2, and actuate photosensitive device 2. If the diameter is larger than the space between slits 1 and 2, then both detectors, 1 and 2 will be on simultaneously. By feeding the outputs of detectors 1 and 2 into the coincidence detector, an output signal can thereby be derived when a drop simultaneously overlaps slits 1 and 2, implying that the drop is larger than the gap between slits 1 and 2. This process continues as the drop passes the remaining slits. When the drop diameter is less than the distance between two of the slits no coincidence output will be obtained from the coincidence detector associated with those particular slits. Each coincidence detector drives an electronic counter. Finally, all counters are scanned and the cumulative size spectrum data recorded during a fixed interval (one minute, for example) is transcribed onto a tape.

There are many advantages to be derived from the slit sizing optical system herein described. A large sampling volume may be employed which is essentially out in the open so as to prevent local turbulence from biasing results.

Observation is continuous since the counters give running total count. Sample data is taken periodically by printing out the counter readings at intervals. The accuracy of sizing is high since the array of slits and gaps are fabricated to high tolerances.

More than one drop can be tolerated within the sampling region at one time since the likelihood of two drops being at the same horizontal level in the sampling region simultaneously is slight. Reasonably small components of lateral velocity as droplets pass through the field of view will not affect the device's ability to measure size accurately. Note that the drops which fall vertically will cross all windows in the array, but if they fall at an angle to the vertical, then some drop images will enter or leave the sizing grid at the sides. This, of course, leads to an incorrect size assignment for those drops. But, it can be shown that just as many drops of any particular size will enter the side at a particular level as will leave it at the same level. Therefore, with sufficient numbers of drops collected, such errors will exactly average out. The overall grid stack height (small in comparison to width) tends to further minimize slant trajectory errors.

As a consequence of the go no-go coincidence technique used to size the drops, the system is relatively insensitive to the amplitude of the signals generated by the drop images. Therefore, light levels are not at all critical and sizing is much less ambiguous than with amplitude sorting techniques used in light scattering instruments.

The accurate measurement of drop sizes by these means requires that the drops be truly spherical in shape. However, it is known that falling raindrops tend to oscillate in shape, becoming ellipsoidal at the limits of oscillation. The frequency of these oscillations decreases rapidly as drop size increases and the amplitude increases with size. Stroboscopic photographs which have been made of freely falling drops have shown an almost equal tendency for the major axis to be vertical or horizontal in smaller sizes. In other words, oscillating drops will, with almost equal probability, be elongated slightly vertically or horizontally at any instant. The vertical to horizontal axis ratio of drops up to 3 mm. in size is greater than 0.92, thus oscillation effects are of small importance in the 0–3 mm. diameter size range.

Other objects and advantages of the present invention will become apparent from the following description thereof as developed in connection with the detailed description of embodiments illustrating its principles.

Figure 2:
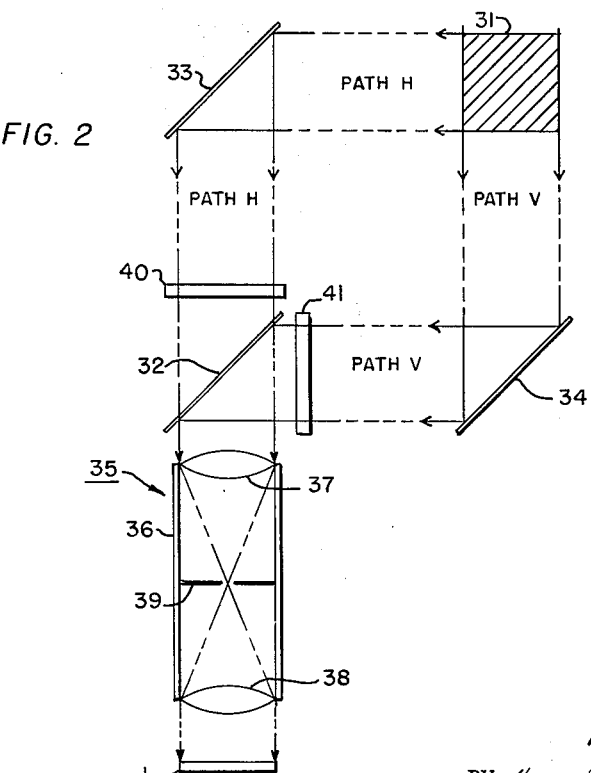

In the drawings:

FIG. 1 is a schematic diagram of the detecting and counting circuitry of this invention, and FIG. 2 is a diagram of the optical system.

Referring now to FIG. 1, there is shown a grid 1 consisting of a plurality of windows 2 to 5 separated by opaque gaps 6, 7 and 8. Each of the windows 2 to 5 consists of the edge of a tapered Lucite strip which pipes light to photomultiplier tubes 9 to 12 respectively. Mounted over the windows are polarizing filters (not shown separately from the windows but to be considered integrally therewith) which are positioned so that all odd numbered windows see only light polarized in one direction and all even numbered windows see light polarized at 90 degrees with respect to that seen by the odd numbered windows. The gap 6 between windows 2 and 3 is set to match the image size of the smallest drop to be counted. Gaps 7 and 8 (and any additional gaps) are progressively wider.

The outputs of photomultipliers 9 and 10 are coupled to the inputs of an AND gate 13. Similarly, photomultipliers 10 and 11 are connected to AND gate 14, photomultipliers 11 and 12 are connected to AND gate 15, and photomultiplier 12 and the one which may be adjacent to it are connected to AND gate 16. In this manner each succeeding pair of photomultipliers is coupled to an AND gate. The number of windows and photomultipliers to be employed is determined by the number of different sizes into which the droplets are to be grouped. AND gates 13 to 16 are coupled to counters 17 to 20 respectively. The counters are coupled through a sequential read out switch 21 to a recorder 22. A timer 23 is connected to the readout switch and controls the operation thereof.

Droplets falling freely through a brightly illuminated sampling region are viewed against a black background by an optical system, to be hereinafter described, which images the droplets on the planar grid 1. As previously stated, the grid consists of slits or windows, all of the same size, are separated by opaque gaps of gradually increasing height. The array of slits thus consists of a series of uniform rectangular windows, narrow in the vertical direction but quite wide horizontally. These are arranged one above another and separated by distances which progressively increase as one traverses the grid from top to bottom.

All droplets within the sampling region will form bright circular images which will traverse the windows in succession as the droplet falls freely through the field. As a drop image crosses slit 2, a photosensitive detector (photomultiplier 9), which views all of the light collected by window 2, will be actuated. Subsequently, the bottom of the drop image will pass onto slit 3, and similarly actuate photosensitive device 10. If the diameter is larger than the space between slits 2 and 3, then both detectors 9 and 10 will be on simultaneously for a short period of time. By feeding the outputs of photomultipliers 9 and 10 into AND gate 13, an output signal can thereby be derived during the time when a drop simultaneously overlaps slits 2 and 3. The implication of such a standardized output pulse is that the drop is larger than the dimension of the gap 6 between slits 2 and 3.

Similarly, this process is repeated for slits 3 and 4 and so on until finally the drop image crosses slit $n-1$ without simultaneously intersecting slit $n$ because its diameter is less than the space between slits $n-1$ and $n$. Since each AND gate drives an electronic counter, the drop under consideration will activate all counters from counter 17 to the $(n-1)$th counter and fail to activate all counters after the $(n-1)$th counter.

Drops A, B, C and D of FIG. 1 illustrate the operation outlined above. As drop A crosses window 2 it causes an output from photomultiplier 9. This signal alone is not enough to cause an output from AND gate 13. Drop B overlaps windows 2 and 3 thus causing outputs from photomultipliers 9 and 10. The coincidence of inputs at AND gate 13 causes an output signal therefrom which is registered at counter 17. Drop C causes an output from photomultiplier 10 as it crosses window 3. Since drop D is smaller in diameter than gap 7 it causes no photomultiplier output signal. Therefore drop D would not be counted by counter 18 or any higher numbered counter.

Thus there has been described a counting and sizing system whcih can size droplets into any reasonable number of size intervals; interval width being determined only by the choice of how many windows one cares to employ. Although the smallest size interval counter 17 records not only droplets lying within that interval but also all larger droplets, this is not objectionable since one has only to subtract from counter 17 the total count of counter 18 to get the actual count in the first interval.

The total count accumulated in each channel is stored in the electronic counters for a predetermined interval of time. At the end of this preset interval all counters are sequentially scanned by means of rotary switch 21 which reads out the accumulated counts stored in the counters and transmits them in sequence to recorder 22. In this manner, the cumulative size spectrum data recorded during a fixed interval (one minute, for example) is transcribed onto a tape in a four second readout. Thereupon all counters are reset to zero and the accumulation of new data begins immediately.

FIG. 2 is a top view of the optical system which defines the horizontal limits of the sample volume in which droplets are to be sized and counted. The sample region is represented by the shaded area 31. An imaging telescope 35 is caused to view the sample region from two directions, at right angles to each other, simultaneously, by means of a half-silvered mirror 32 (50–50 beam splitter) and two fully silvered mirrors 33 and 34. The telescope consists of a cylindrical housing 36, lenses 37 and 38 and a telecentric stop 39 which causes it to accept only those light rays which are close to paraxial so that its field of view is close to zero degrees. This gives the desirable effect of giving great depth of field so that all drops in the sample region are in sharp focus and also prevents ambient illumination from having an effect on the operation of the system. All mirrors are mounted at 45° to the telescope's axis. The half-silvered mirror 32 is set up directly in front of the telescope objective lens so as to pass one half of all rays directly ahead and direct the other half 90° to the side. Both paths are then deflected 90° by the two fully silvered mirrors 33 and 34 so as to intersect at 90° with respect to each other. The sample volume 31 is thus defined by the right angle intersection of the two projections of the sizing grid windows and is square in cross section.

Any drop falling through the square sample area 31 therefore forms two images on the same horizontal level of the sizing grid 1 at the telescope's image plane. If, on the other hand, the drop falls through one optical path but not the other (outside the sample area) it forms only one image on the sizing grid. It therefore becomes possible to count only the drops falling through area 31 by the following procedure.

The two optical paths represented by broken lines are labeled H and V. Polarizers 40 and 41 placed in paths H and V respectively so as to polarize one image horizontally and one vertically. As previously stated in reference to FIG. 1, polarizers are mounted over the windows of grid 1 so that all odd-numbered windows see only the H path and all even-numbered windows see only the V path. Then coincidences will be observed if and only if a V and an H image are seen simultaneously; i.e., the drop is within the sample region.

Thus a square sample area can be achieved, but of more importance, the illumination of the sample volume can be carried out with ordinary floodlights at various angles to the sample region.

While the preferred embodiment has been described herein and illustrated in the accompanying drawings, it is to be understood that various modifications, omissions and refinements which depart from the disclosed embodiment may be adopted without departing from the spirit and scope of the present invention.

It is obvious that the number of windows making up the sizing grid as well as the width of the gaps may be varied to supply the number of size intervals desired.

To minimize the number of windows and photosensitive detectors required for a specified number of size intervals, it is quite feasible to utilize each window, associated photodetector and signal pulse amplifier more than one time. That is, each window may feed more than two coincidence detectors. Thus the gap between windows 2 and 3 establishes size channel No. 1, that between windows 3 and 4 establishes channel No. 2, and that between windows 2 and 4 establishes yet another size channel.

The horizontal cross-sectional area of the sampling volume in the present instrument may be defined spatially by the intersection of a collimated rectangular illumination beam and the optical projection of the sizing grid's windows. Its shape is that of a parallelogram since the illuminating beam is inclined to the optical axis of the telescope in order to maximize image brightness. However this arrangement has three minor disadvantages: (a) the ratio of perimeter to area for the parallelogram is greater than that for a square; (b) it requires greater depth of field from the imaging optics than would a square; (c) the source of illumination must be a collimated beam with sharp edges since it defines one dimension of the sampling cross-sectional area.

Although the instrument described herein was designed for the counting and sizing of raindrops, the technique of counting and sizing the optical images of objects by means of a grid of spaced windows and associated photodetectors during coincidence circuits is considered to have other applications. Since the method allows very fast and accurate sizing of objects freely passing through a sampling region, it could be used for go no-go industrial sizing problems or for quality control applications. Of course, since only one linear dimension is measured, the objects have to be spherical if they are to be allowed to fall freely through the sampling region. However, nonspherical objects could also be handled provided they can be aligned before passing.

For two dimensional circular objects, such as film images or certain microscope images, the technique can readily be used either to give spectrum or again a go no-go inspection and count.

The present instrument uses unity magnification in imaging raindrops on the sizing grid. Clearly, this is arbitrary, and any magnification or minification ratio desired could be used provided that adequate depth of field is still maintained.

Although Lucite strips are used in the present instrument both as sizing grid windows and light pipes to convey signals to the photomultiplier detectors, alternative techniques may be preferable in some applications. For example, the sizing grid can be fabricated as an insulating plate with strips of photoconducting material (CdS or PbS) on its surface as both sizing windows and photodetectors.

What is claimed is:

1. An instrument for sizing and counting rapidly moving sphere-like objects comprising: a plurality of light conducting means, each adjacent pair of said last mentioned means being separated by gradually increasing distances; detector means associated with each of said light conducting means for producing an output signal in response to light incident to its associated light conducting means; a plurality of AND gates; each pair of detector means having its output coupled to one of said AND gates; a counter coupled to each AND gate; and means for projecting the images of objects to be sized and counted onto said plurality of light conducting means, so that the coincidence of any part of an image on two adjacent light conducting means produces outputs from the detector means associated therewith, thereby causing an output signal from the AND gate coupled thereto, which AND gate output is registered in its associated counter.

2. The instrument set forth in claim 1 further comprising: a recorder; and means for sequentially switching the output of each of said counters to said recorder.

3. The instrument of claim 1 in which said light conducting means are elongated rectangular parallel strips of light conducting material, said strips being arranged parallel to each other in a rectangular grid.

4. The instrument of claim 1 in which said image projecting means comprises a telescope having its axis perpendicular to the plane in which said light conducting means lies; a half-silvered mirror positioned along the axis of said telescope at the end thereof opposite said light conducting means, said mirror being inclined at an angle of 45° with respect to said axis; first and second fully silvered mirrors the planes of which are parallel to that of said half-silvered mirror, said first fully silvered mirror being centered on the axis of said telescope beyond said half-silvered mirror and said second fully silvered mirror being centered on a line which is perpendicular with the axis of said telescope and which passes through the center of said half-silvered mirror; a first polarizer between said first fully silvered and said half-silvered mirrors which polarizes light in a given direction; a second polarizer between said second fully silvered and said half-silvered mirror which polarizes light in an orthogonal direction with respect to said first polarizer; and a polarizer positioned over each of said light conducting means, the direction of polarization of each of said last mentioned polarizers being alternately rotated so that every other one of said light conducting means sees light reflected from said first fully silvered mirror and the remaining of said light conducting means sees only light reflected from said second fully silvered mirror.

5. An automatic raindrop size spectrometer comprising: a rectangular grid of parallel, elongated light-conducting windows, the gap between adjacent windows increasing in size as the grid is traversed from one end to the other; detector means associated with each of said windows for producing an output signal in response to light incident to its associated window; a plurality of AND gates, each pair of adjacent detector means having its output coupled to one of said AND gates; a plurality of counters, one being coupled to each AND gate; recorder means; switch means for sequentially coupling said counters to said recorder means; a telescope positioned adjacent said grid and having its axis perpendicular thereto; a half-silvered mirror positioned along the axis of said telescope at the end thereof opposite said grid; said mirror being inclined at an angle of 45° with respect to said axis; first and second fully silvered mirrors the planes of which are parallel to that of said half-silvered mirror, said first fully silvered mirror being centered on the axis of said telescope beyond said half-silvered mirror and said second fully silvered mirror being centered on a line which is perpendicular with the axis of said telescope and which passes through the center of said half-silvered mirror; a first polarizer between said first fully silvered and said half-silvered mirrors which polarizes light in a given direction; a second polarizer between said second fully silvered and said half-silvered mirror which polarizes light in an orthogonal direction with respect to said first polarizer; and a polarizer positioned over each of said windows, the direction of polarization of each of said last mentioned polarizers being alternately rotated so that every other one of said windows sees light reflected from said first fully silvered mirror and the remaining of said windows sees only light reflected from said second fully silvered mirror.

6. An automatic raindrop size spectrometer comprising: a grid consisting of a plurality of parallel, elongated light-conducting windows; means associated with said grid for producing an output pulse in response to the simultaneous reception of light by any two adjacent windows; a telescope positioned adjacent said grid and having its axis perpendicular thereto; a half-silvered mirror positioned along the axis of said telescope at the end thereof opposite said grid, said mirror being inclined at an angle of 45° with respect to said axis; first and second fully silvered mirrors the planes of which are parallel to that of said half-silvered mirror, said first fully silvered mirror being centered on the axis of said telescope beyond said half-silvered mirror and said second fully silvered mirror being centered on a line which is perpendicular with the axis of said telescope and which passes through the center of said half-silvered mirror; a first polarizer between said first fully silvered and said half-silvered mirrors which polarizes light in a given direction; a second polarizer between said second fully silvered and said half-silvered mirror which polarizes light in an orthogonal direction with respect to said first polarizer; and a polarizer positioned over each of said windows, the direction of polarization of each of said last mentioned polarizers being alternately rotated so that every other one of said windows sees light reflected from said first fully silvered mirror and the remaining of said windows sees light only reflected from said second fully silvered mirror.

References Cited in the file of this patent

UNITED STATES PATENTS

| | | |
|---|---|---|
| 2,958,464 | Nassenstein | Nov. 1, 1960 |
| 3,085,159 | McNaney | Apr. 9, 1963 |